US006627697B2

(12) United States Patent
Barney et al.

(10) Patent No.: US 6,627,697 B2
(45) Date of Patent: Sep. 30, 2003

(54) LOW DENSITY ABLATOR COMPOSITION

(75) Inventors: Andrea O. Barney, Waltham, MA (US); Claire Anton, Los Alamitos, CA (US); John Crumpler, Huntington Beach, CA (US); John Stanley Jones, Anaheim, CA (US); Bryan Clark Brewer, Laguna Hills, CA (US)

(73) Assignee: The Boeing Company, Chicago, IL (US)

( * ) Notice: Subject to any disclaimer, the term of this patent is extended or adjusted under 35 U.S.C. 154(b) by 16 days.

(21) Appl. No.: 09/911,194

(22) Filed: Jul. 23, 2001

(65) Prior Publication Data

US 2003/0022983 A1 Jan. 30, 2003

(51) Int. Cl.⁷ ............................................... C09K 21/14
(52) U.S. Cl. ........................ 524/588; 523/179; 428/447; 427/387
(58) Field of Search ................................ 524/588, 492, 524/493; 523/179; 427/387; 428/447

(56) References Cited

U.S. PATENT DOCUMENTS

| | | | |
|---|---|---|---|
| 3,723,481 A | | 3/1973 | Bobear |
| 3,875,106 A | | 4/1975 | Lazzaro |
| 4,031,059 A | * | 6/1977 | Strauss ................... 260/37 SB |
| 4,077,921 A | | 3/1978 | Sharpe et al. |
| 4,594,368 A | | 6/1986 | Salyer et al. |
| 4,595,714 A | | 6/1986 | McAllister et al. |
| 4,848,869 A | * | 7/1989 | Urruti ..................... 350/96.33 |
| 5,064,868 A | | 11/1991 | Simpson et al. |
| 5,661,198 A | | 8/1997 | Inatani et al. |

* cited by examiner

*Primary Examiner*—Margaret G. Moore
(74) *Attorney, Agent, or Firm*—Harness Dickey & Pierce P.L.C.

(57) ABSTRACT

A highly abrasion resistant and durable, low density ablator composition is provided that comprises a base silicone resin, silica microballoons as a filler, a catalyst, and a thinning fluid to control the viscosity of the base silicone resin. The density of the resulting composition is approximately 0.32 g/cc yet the composition has excellent abrasion resistance. Furthermore, the ratio of filler to base silicone resin, by weight, is approximately 0.91. The ablator composition is also RF (radio frequency) transparent, moisture resistant, and low cost. Methods of mixing the ablator composition and forming ablative structures are also provided.

27 Claims, 4 Drawing Sheets

LOW DENSITY ABLATOR COMPOSITION

FIELD OF THE INVENTION

The present invention relates generally to ablator compositions and more particularly to low density yet highly durable ablator compositions and methods for mixing the compositions and forming ablative thermal protection systems.

BACKGROUND OF THE INVENTION

Ablative materials have been used in a variety of applications to protect and insulate structure that is subjected to extreme thermal conditions. For example, many aerospace vehicles that traverse, exit, and enter the atmosphere of the Earth travel at high velocities, and as a result, their exterior aerosurfaces, and to some degree their substructure, experience high aerothermal loads. Aerothermal loads have been managed using a variety of techniques including insulation, radiant cooling, active cooling, conduction and convective cooling, and by phase change or ablative materials. Generally, ablative materials are applied to the affected aerosurfaces to absorb the extreme heat in order to insulate the vehicle from the thermal environment.

The thermal management technique of ablation has been widely used for a variety of applications since the early 1930s. Ablative materials were used in early rocket systems for nose cap protection and have also been used as re-entry heat shields on the Gemini and Apollo space vehicles, and further on many modern rocket nozzles. Many of these materials, although suitable for use in the aforementioned applications, have handling and longevity issues that preclude application on a system that is subjected to frequent handling and that may be stored for several years prior to use.

Known ablative materials comprise a variety of constituent components, each at certain percentages by weight or volume, to achieve the desired level of thermal protection and other physical properties. Generally, ablator compositions are a composite material comprising a resin matrix with a variety of filler materials to reduce the overall density or provide other physical properties. For example, U.S. Pat. No. 4,031,059 to Strauss discloses low density ablator compositions that employ an elastomeric silicone resin with a variety of filler materials including ground cork, silica or glass microspheres, phenolic microballoons, and silica and/or carbon fibers. The compositions of Strauss, however, specifically limit the density to a range of 0.20 g/cc (12.10 lb/ft$^3$) to 0.30 g/cc (19.00 lb/ft$^3$), and more specifically, the density of an RF (radio frequency) transparent composition to 0.25 g/cc (15.55 lb/ft$^3$).

Unfortunately, the lower density ablator compositions of the known art, especially those near 0.24 g/cc (15.55 lb/ft$^3$) such as Strauss, have low abrasion resistance and are easily damaged and worn during handling. As a result, the fragile nature of lower density ablator compositions requires special handling after fabrication, which, in many instances, includes custom packaging for shipment and an attendant increase in cost.

The ratio of filler to resin, by weight or volume, is relatively high in the known art, e.g. 2.2:1 by weight in Strauss. With higher ratios of filler to resin, plausible methods of forming an ablative structure are somewhat limited, such as the closed-die molding process disclosed in Strauss. As an example, a large volume of fibers can clog or severely limit the flow of ablator composition flowing from a nozzle using spraying methods. Although an increased amount of fillers can reduce the overall density or improve mechanical properties of the ablator composition for increased performance, the trade-off with available forming methods presents limitations in terms of producing lower cost structures.

Additional known art ablator compositions have included a variety of other constituent elements such as metal fillers, colloidal clay fillers, boron and oxygen compounds, polyurethane resins, a mixture of both epoxy and polysulfide resins, and many others too numerous to detail herein. The known art compositions, however, include numerous fillers to achieve a desired set of properties such as thermal, mechanical, and others. As a result, such compositions may be costly and difficult to fabricate with a relatively large number and variety of fillers. In addition, many known art ablator compositions demonstrate relatively low thermal and abrasion resistance performance under high heat flux and pressure loads observed in Mach 6 to 8 vehicles.

Accordingly, there remains a need in the art for an ablator composition that is of low density yet has high abrasion resistance and durability before, during, and after high thermal loads, and which is relatively low cost and simple to fabricate.

SUMMARY OF THE INVENTION

In one preferred form, the present invention provides an abrasion resistant and more durable, low density ablator composition that generally comprises silica microballoons embedded in a silicone resin. The ablator composition further comprises a catalyst to cause crosslinking of the polymer chains in the base silicone resin, and a thinning fluid to control the viscosity of the composition.

The resulting ablator composition has a low density, approximately 0.32 g/cc (20.74 lb/ft$^3$), compared with known art low density ablator compositions. Further, the ablator composition of the present invention can withstand temperatures up to approximately 1,760° C. (3200° F.) while ablating slowly. In addition, the composition has low thermal conductivity, is RF transparent so as to not impede signal transmissions to and from the vehicle, and has high abrasion resistance and durability.

In other preferred forms, the present invention provides methods for mixing the ablator composition and forming ablative structures. The methods generally include the steps of mixing the individual constituent components of the ablator composition in prescribed percentages by weight and in a particular order, as more fully described hereinafter, and forming the composition into a final part or structure. The forming methods include, but are not limited to, manual application to the structure, open or closed die molding, spraying, and extrusion. Depending on the application method used, the percentages of constituent components of the ablator composition will vary accordingly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
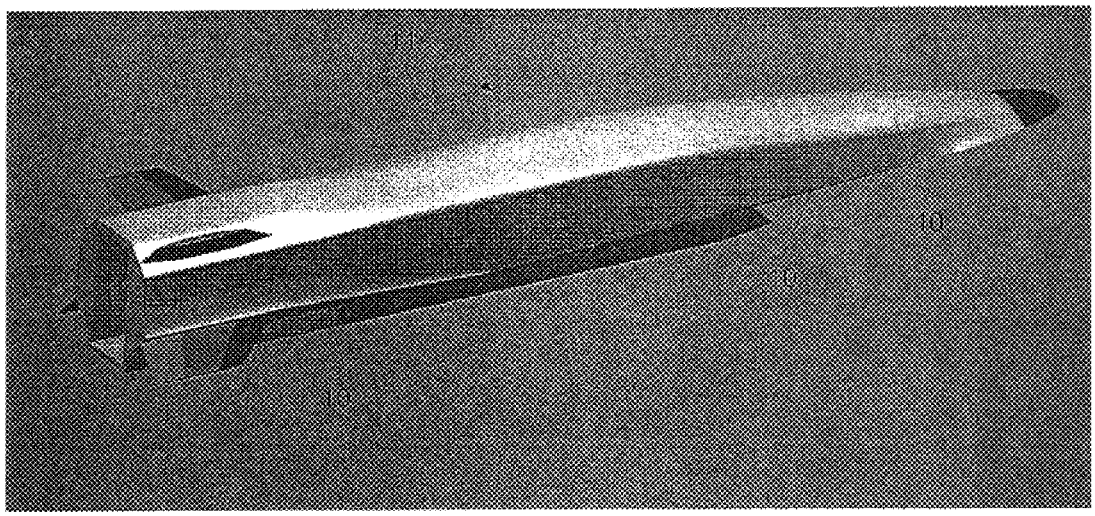
FIG. 1 is a perspective view of an aerospace vehicle traveling at high Mach numbers through the atmosphere of the Earth in accordance with the teachings of the present invention.

Referring to the drawings, the ablator composition of the present invention is applied to the exterior surfaces of an aerospace vehicle 11 as illustrated and generally indicated by reference numeral 10 in FIG. 1. The aerospace vehicle 11 is shown flying through the atmosphere of the Earth, where high acceleration and velocities create extremely elevated thermal loads across the exterior surface, or aerosurface, of the vehicle 11. Accordingly, the ablator composition 10 provides thermal protection for the vehicle during these extreme thermal conditions.

Figure 2:
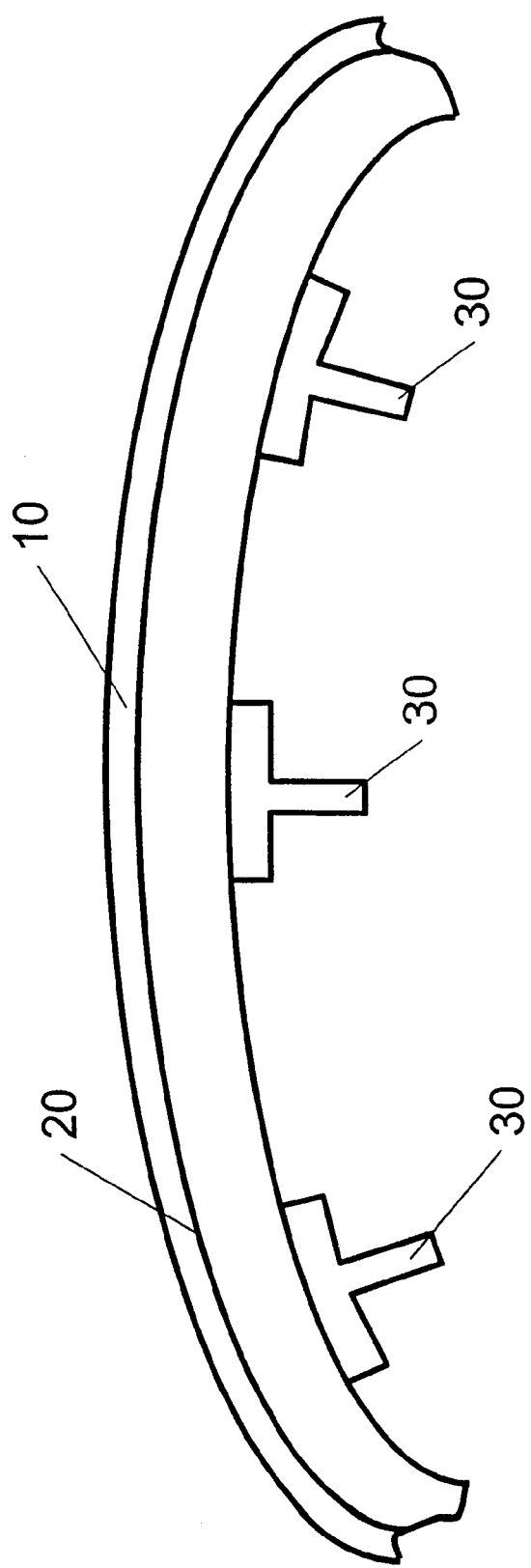
FIG. 2 is a cross-sectional view of an ablator composition formed on a structure in accordance with the present invention.

Referring to FIG. 2, the ablator composition 10 is shown applied to a portion of the outer moldline (OML) 20 of the aerospace vehicle 11. In addition to protecting the OML 20, the ablator composition 10 further provides protection to substructure 30 adjacent the OML 20. Accordingly, additional structure and/or systems within close proximity of the OML 20 are protected from the extreme thermal environment by the ablator composition 10.

The application of the ablator composition 10 to an aerospace vehicle should not be construed as limiting the invention; rather the application is merely illustrative of one structure and one operating environment in which the present invention has particular utility. The ablator composition of the present invention can further be employed with a wide variety of structures and systems that must withstand high thermal loads for an extended duration.

The preferred ablator composition 10 of the present invention generally comprises four (4) constituent elements: (1) a base silicone resin; (2) silica microballoons; (3) a catalyst; and (4) a thinning fluid. The silicone resin serves as a binder for the microballoons and is a secondary contributor to the thermal conductivity of the ablator composition 10. The silica microballoons are generally used to reduce the overall density of the ablator composition 10 and are a primary contributor to reducing thermal conductivity. Further, the catalyst is added to the ablator composition 10 to cause crosslinking of polymer chains in the base silicone resin, and the thinning fluid is added to adjust the viscosity of the base silicone resin according to the forming method being used. The ablator composition 10 of the present invention is hereinafter referred to as the Boeing Lightweight Ablator System ("BLA").

In one preferred form, BLA is comprised of approximately 41.7% by weight of the base silicone resin, approximately 37.8% by weight of the silica microballoons, approximately 4.1% by weight of the catalyst, and approximately 16.4% by weight of the thinning fluid. In one form, the viscosity of the base silicone resin is approximately 38 stokes and the viscosity of the thinning fluid (either reactive or non-reactive) is approximately 50 centistokes. Preferably, the thinning fluid ranges in viscosity from approximately 0.5 to approximately 500 centistokes at approximately 25° C. (77° F.) with a specific gravity range between approximately 0.7 to approximately 0.97 at approximately 25° C. (77° F.). The preferred formulation and acceptable ranges for variations of the ablator composition is depicted below in Table I.

TABLE I

| Constituent Element | Preferred % by Weight | Acceptable Range of %s by Weight |
|---|---|---|
| Base Silicone Resin | 41.7 | 30–50 |
| Silica Microballoons | 37.8 | 25–67 |
| Catalyst | 4.1 | 3–5 |
| Thinning Fluid | 16.4 | 0–20 |

The density of BLA is approximately 0.32 g/cc (20.74 lb/ft$^3$), which is relatively low compared to ablator compositions of the known art. In addition, BLA has high abrasion resistance and durability. BLA has been tested under high Mach conditions and has withstood temperatures up to 1,760° C. (3200° F.) while ablating slowly at a rate of approximately 0.0762 mm/sec (3 mil/sec). In addition, the room temperature thermal conductivity of the ablator composition is relatively low at approximately 126 mW/mK.

Further preliminary testing has shown that BLA has a tensile strength greater than approximately 100 lb/in$^2$, an equilibrium water weight gain less than approximately 10 percent, and greater than approximately 50 percent radio frequency transmission. Variations on properties of BLA may vary according to the constituent elements contained therein, and therefore, the properties disclosed herein are merely exemplary and shall not be construed as limiting the scope of the present invention.

In preliminary high flow rate testing against commercially available ablative materials, BLA consistently delivered low backface temperatures, low char density, and excellent char durability. Accordingly, BLA has improved thermal properties, abrasion resistance, and durability over various other ablator compositions of the known art, while providing low density and low cost thermal protection.

The low cost of BLA is attributed in part to commercially available resins, catalysts, microballoons, and thinning fluids. The commercial material for the base silicone resin is preferably SYLGARD® 184, supplied by Dow Corning Corp., which comprises both the silicone resin and the catalyst. The commercial material for the silica microballoons is preferably Eccospheres® SI, supplied by Emerson & Cuming, Inc. Further, the microballoons are composed primarily of silica (>95% SiO$_2$) and have a particle diameter ranging from 5 to 150 microns. Additionally, the commercial material for the thinning fluid is preferably DC200, supplied by Dow Corning Corporation, in the molded form of BLA. Further, the thinning fluid is preferably OS-10 in the sprayed form of BLA, although OS-10 may also be used in the molded form of BLA.

The properties of the microballoons that contribute significantly to the performance of the BLA further comprise density and wall thickness. More specifically, the wall thickness of the microballoons according to the present invention is preferably between approximately 1.5 and 2.6 μm. Additionally, the bulk density of the microballoons is between approximately 0.15 g/cc (9.5 lb/ft$^3$) and 0.31 g/cc (19.35 lb/ft$^3$).

BLA is generally fabricated or mixed for application by first placing the prescribed percent by weight of base silicone resin in a container. Next, the prescribed percent by weight of thinning fluid is added, followed by the prescribed percent by weight of catalyst. The combination of the base silicone resin, the thinning fluid, and the catalyst are then thoroughly mixed to ensure that the resin is fully catalyzed. After the catalyst is added and mixed with the resin and the thinning fluid, but before the microballoons are added, the room temperature pot life of the mixture is approximately two (2) hours.

After the resin is fully catalyzed, the silica microballoons are added to and mixed with the resin. Preferably, the mixing time is minimized to reduce the possibility that the microballoons will crush. After the microballoons are thoroughly mixed, the room temperature pot life of the mixture is substantially increased to approximately twenty-four (24) hours at ambient temperature. Accordingly, a variety of manufacturing techniques can be used to fabricate the final ablative structure considering the pot life duration.

Preferred forming methods of BLA comprise manual application to a surface, open and closed die molding, spraying, and extrusion, although other methods commonly known in the art may also be used. BLA may either be cobonded with the structure that is to be protected or secondarily bonded thereon. With spraying, the bond between BLA and the structure is created simultaneously with the spraying operation and no secondary bonding is required. However, a coupling agent may be applied to the structure to further strengthen the bond of BLA with the structure when using spraying methods. Alternately, the coupling agent may be used to strengthen the bond of BLA with the structure with other forming methods such as a molded composition that is cobonded. The spraying methods further comprise, but are not limited to, single nozzle, multiple nozzle, convergent spraying, and others commonly known in the art. Moreover, BLA may be mixed within the spray system rather than being pre-mixed prior to application.

After forming, BLA is preferably subjected to a heat cure of at least approximately 65.6° C. (150° F.) and no more than approximately 149° C. (300° F.) for approximately one (1) hour. However, the specific cure cycle will depend on the geometry of the part, the specific composition, and the associated tooling, among others. For example, a typical cure cycle for a 14"×24"×1" flat molded panel of BLA is approximately 121° C. (250° F.) for approximately two (2) hours. Additionally, BLA will cure at room temperature, however, the cure time ranges between approximately four (4) to ten (10) days and may be prohibitive in a high production environment. Other heating methods commonly known in the art, including but not limited to, microwave, autoclave, and others may also be used to cure BLA according to the present invention. In addition, the ablative structure may further be post formed and subjected to a further cure cycle to control the thickness and the surface finish thereof.

Depending on the forming method, the viscosity of BLA is varied to provide for sufficient wetting of the microballoons and ease of fabrication. With manual application, or troweling, the dynamic viscosity of BLA in one form is approximately between $10^5$ Pa-s and $10^6$ Pa-s. For instance, the trowelable mixture does not flow under its own weight at room temperature and has a paste or grout-like consistency. Additionally, the viscosity for spraying is somewhat lower than that of the trowelable mixture yet somewhat higher than that of the raw materials.

Figure 3:
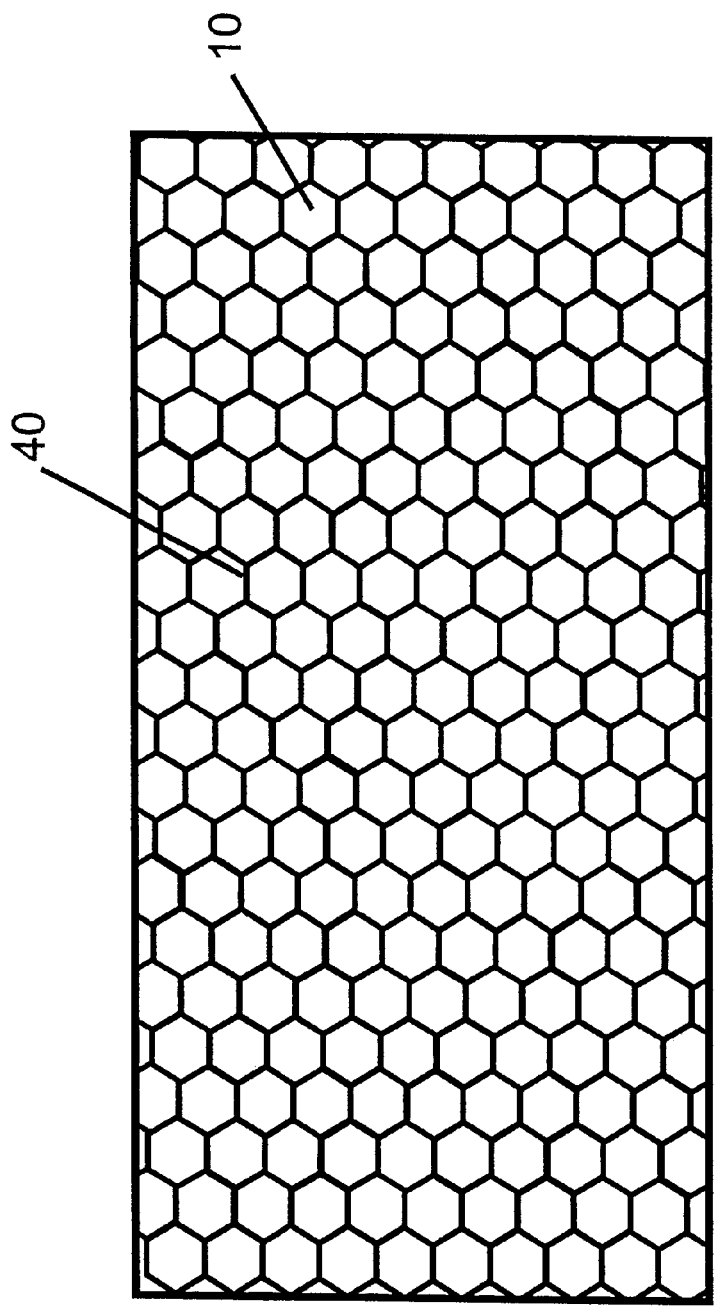
FIG. 3 is a top view of a honeycomb core embedded in an ablator composition in accordance with the present invention.

Referring to FIG. 3, BLA can be reinforced in another preferred form to provide additional structural properties by integrating a honeycomb core 40 within its composition. In one preferred forming method, a layer of BLA is placed throughout a cavity of a mold and a piece of honeycomb core 40 is placed over and subsequently pressed into BLA. Alternately, a layer of BLA is placed in the cavity of the mold, followed by the honeycomb core 40, and then followed by another layer of BLA.

With the honeycomb core embodiment of the present invention, the forming method is preferably closed-die molding where the material is either vacuum bagged or placed into a hot press to ensure the honeycomb core 40 is uniformly filled with BLA. In one form, the material is preferably cured at approximately 149° C. (300° F.) for approximately one hour. The honeycomb core 40 is preferably a phenolic fiberglass material, however, other honeycomb core materials commonly known in the art may also be incorporated with BLA according to the properties that are desired.

In addition to the honeycomb core 40, alternate reinforced embodiments comprise a two-dimensional woven material or a non-woven material as the reinforcement member. Accordingly, the reinforcement may comprise continuous or discontinuous fiber forms commonly known in the art. Similar to the honeycomb embodiments, the two-dimensional woven and non-woven reinforced structures comprise the reinforcement impregnated with BLA. The resulting structure is formed using a variety of manufacturing techniques, such as the manual troweling method previously described in connection with the honeycomb core reinforcement embodiment.

Figure 4:
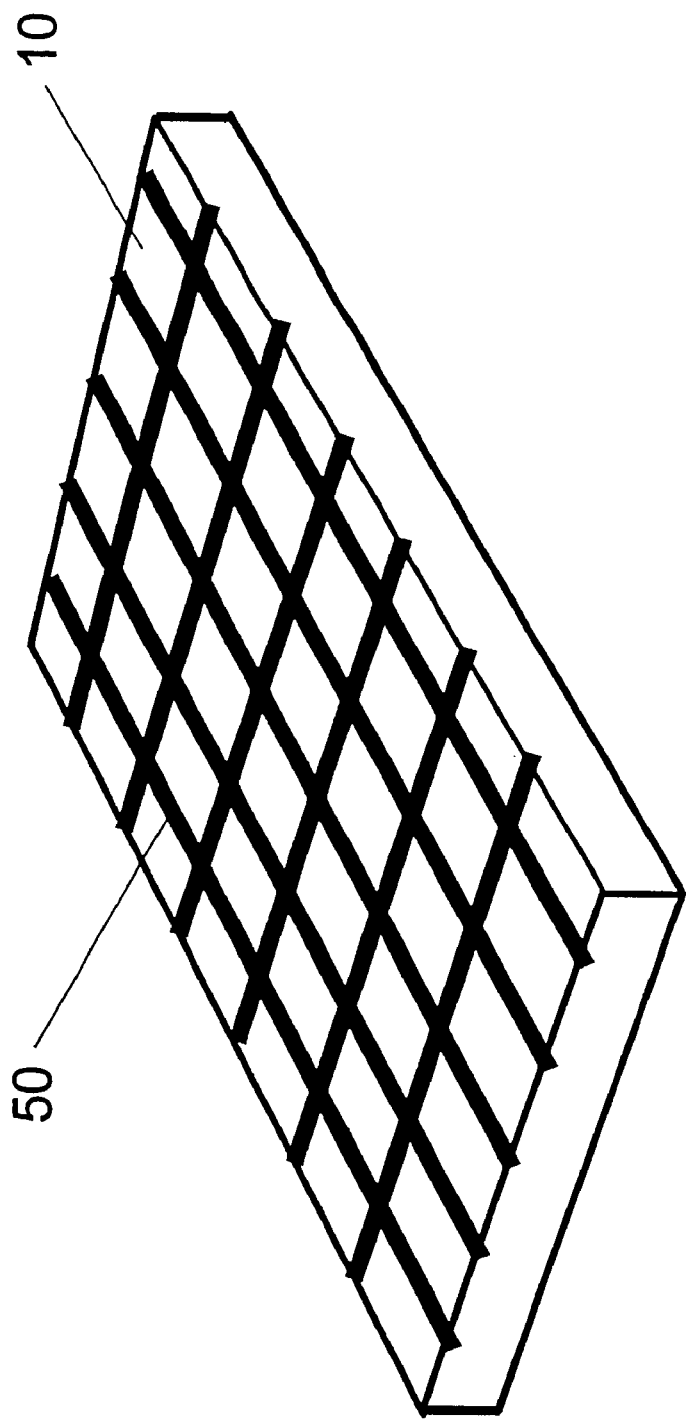
FIG. 4 is a top view of scoring in an ablator composition in accordance with the present invention.

Referring to FIG. 4, the surface of an ablative structure of the present invention can further be "scored" to suppress surface cracking during and after heat exposure. The scoring 50 may comprise a regular pattern of surface indentation, approximately 0.254 cm (0.10 in.) in depth and at a spacing of approximately 2.54 cm (1 inch), which is created prior to or after curing the ablative structure. In preliminary tests, scoring 50 significantly suppressed surface cracking observed in monolithic BLA specimens that did not comprise scoring 50. As will be appreciated by those skilled in the art, the depth and spacing of scoring 50 may vary according to specific materials and performance requirements. Moreover, alternate patterns other than the square grid scoring as illustrated may also be employed.

In another preferred form, the ablator composition of the present invention may further comprise an additional fiber filler. The fiber filler may comprise, for example, an oxide ceramic such as silica ($SiO_2$), alumina ($Al_2O_3$), mullite ($Al_2O_3$—$SiO_2$), wherein the fiber fillers provide additional mechanical properties to the ablator composition without compromising RF transparency. Other fiber fillers such as carbon may also be used, however, the RF transparency of the material will be adversely affected.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An ablator composition comprising:

approximately 30–50 percent by weight of a base silicone resin;

greater than 0 and up to approximately 20 percent by weight of a thinning fluid;

approximately 3–5 percent by weight of a catalyst; and approximately 25–67 percent by weight of a low density filler material, wherein the density of the ablator composition ranges between at least 0.30 and approximately 0.50 g/cc.

2. The ablator composition of claim 1, wherein the density of the ablator composition ranges between approximately 0.32 and 0.40 g/cc.

3. The ablator composition of claim 1, wherein the ratio by weight of the low density filler material to the base silicone resin ranges from approximately 0.4:1 to 2:1.

4. The ablator composition of claim 1, wherein the ratio by weight of the base silicone resin to the catalyst is less than approximately 12:1.

5. The ablator composition of claim 1, wherein the low density filler material comprises silica microballoons.

6. The ablator composition of claim 5, wherein the silica microballoons further comprise a wall thickness, and the wall thickness is between approximately 1.5 and 2.6 μm.

7. The ablator composition of claim 5, wherein the silica microballoons further comprise a density, and the density is between approximately 0.15 g/cc and 0.31 g/cc.

8. The ablator composition of claim 1, wherein the tensile strength of the ablator composition is greater than approximately 100 lb/in$^2$.

9. The ablator composition of claim 1, wherein the equilibrium water weight gain of the ablator composition is less than approximately 10 percent.

10. The ablator composition of claim 1, wherein the ablator composition has at least approximately 50 percent radio frequency transmission.

11. The ablator composition of claim 1, wherein the low density filler material has a density less than approximately 0.27 g/cc.

12. The ablator composition of claim 1, wherein the thinning fluid has a viscosity of approximately 50 centistokes, and the base silicone resin has a viscosity of approximately 38 stokes at approximately 25° C.

13. The ablator composition of claim 1 further comprising a honeycomb core, wherein the honeycomb core provides additional structural stiffness and strength.

14. The ablator composition of claim 1 further comprising a fabric, wherein the fabric provides additional structural stiffness and strength.

15. The ablator composition of claim 1 further comprising a non-woven material, wherein the non-woven material provides additional structural stiffness and strength.

16. The ablator composition of claim 1 further comprising a fiber filler, wherein the fiber filler provides improved mechanical properties.

17. A method of forming an ablative structure, the method comprising the steps of:
(a) mixing:
approximately 30–50 percent by weight of a base silicone resin;
greater than 0 and up to approximately 20 percent by weight of a thinning fluid;
approximately 3–5 percent by weight of a catalyst; and
approximately 25–67 percent by weight of a low density filler, thereby forming an ablator composition;
(b) forming the ablator composition into a geometrical shape; and
(c) curing the geometrical shape.

18. The method of claim 17, wherein the step of forming comprises die molding.

19. The method of claim 17, wherein the step of forming comprises extrusion.

20. The method of claim 17, wherein the step of forming comprises manual application of the resulting mixture of step (a) to a surface.

21. The method of claim 17, wherein the step of forming comprises spraying onto a surface.

22. The method of claim 21 further comprising the step of post forming the ablative structure to control the thickness and surface finish.

23. The method of claim 22 further comprising the step of curing the post formed ablative structure.

24. The method of claim 21 further comprising the step of applying a coupling agent to the surface prior to spraying to enhance bonding between the resulting mixture and the surface.

25. The method of claim 21, wherein the ablator composition is mixed within a spray system.

26. The method of claim 17 further comprising the step of scoring the ablator composition.

27. A method of mixing a low density ablator composition, the method comprising the steps of:
(a) placing approximately 30–50 percent by weight of a base silicone resin into a container;
(b) mixing greater than 0 and up to approximately 20 percent by weight of a thinning fluid with the base silicone resin;
(c) mixing approximately 3–5 percent by weight of a catalyst with the base silicone resin and the thinning fluid until the silicone resin is fully catalyzed; and
(d) mixing approximately 25–67 percent by weight of a low density filler material with the resulting mixture of step (c).

* * * * *